United States Patent [19]
Weaver

[11] Patent Number: 4,460,483
[45] Date of Patent: Jul. 17, 1984

[54] METHODS AND HYDROCARBON BASE TREATING FLUIDS FOR STABILIZING WATER SENSITIVE CLAY CONTAINING FORMATIONS

[75] Inventor: Jimmie D. Weaver, Duncan, Okla.

[73] Assignee: Halliburton Company, Duncan, Okla.

[21] Appl. No.: 310,166

[22] Filed: Oct. 9, 1981

[51] Int. Cl.³ ............................................. E21B 43/12
[52] U.S. Cl. .......................... 252/8.55 R; 166/305 R; 405/264
[58] Field of Search ............ 252/8.5 C, 8.5 P, 8.55 R, 252/8.55 D; 166/275, 305 R; 405/264; 524/528, 612; 548/341

[56] References Cited

U.S. PATENT DOCUMENTS

| | | | |
|---|---|---|---|
| 2,761,843 | 9/1956 | Brown | 252/8.55 |
| 2,999,063 | 9/1961 | Hoeppel | 252/85 |
| 3,542,044 | 11/1970 | Hansen et al. | 252/8.55 X |
| 4,158,521 | 6/1979 | Anderson et al. | 405/264 |
| 4,374,739 | 2/1983 | McLaughlin et al. | 252/8.55 |

Primary Examiner—Herbert B. Guynn
Attorney, Agent, or Firm—Thomas R. Weaver; G. Keith deBrucky

[57] ABSTRACT

Hydrocarbon base treating fluids for stabilizing water sensitive clay containing formations against damage to flow permeability are provided. The treating fluids are comprised of a hydrocarbon external, hydrocarbon liquid-aqueous clay stabilizing polymer solution emulsion dispersed in a hydrocarbon carrier liquid. Methods of forming and using the treating fluids are also provided.

11 Claims, No Drawings

METHODS AND HYDROCARBON BASE TREATING FLUIDS FOR STABILIZING WATER SENSITIVE CLAY CONTAINING FORMATIONS

Difficulty is often encountered in producing oil and gas wells wherein the producing subterranean formation contains water-sensitive clays and other fines capable of migrating in the formation. Normally, the clays and other fines in the formation cause no obstruction to flow through the formation to the wellbore, but when the clays and fines are contacted with water foreign to the formation, the clays swell and the fines migrate with the production stream often plugging and/or severely diminishing production flow through the formation into the wellbore. Sometimes the loss of permeability in a water-sensitive subterranean formation is due solely to clay swelling without the migration of fines in the formation. However, it is believed that swelling clays are the major mechanism which causes the dislocation of fines and the migration thereof.

In order to prevent foreign water contact with clays in subterranean formations, oil base drilling fluids, completion fluids and other fluids used in the drilling and completion of wells penetrating such formations have heretofore been used. However, even where oil or hydrocarbon base fluids are utilized, water intrusion into the producing formation from other subterranean formations often occurs causing the swelling of clays therein, the migration of fines and the reduction in permeability of the formation.

Numerous attempts have been made heretofore to control the ill effects of water on clay and/or other fines in subterranean formations. For example, treating solutions containing cations such as potassium, calcium, ammonium and hydrogen ions, have been introduced into clay-containing subterranean formations whereby the clays are contacted thereby. Ions contained in the clays are replaced by the ions in the solutions thereby transforming the clays into relatively non-swelling forms. While success has been achieved with this method, the exchanging of other ions for ions in the clays is only a temporary remedy in that counter replacement can readily take place.

In order to make the replacement of ions in the clays more permanent, inorganic polycationic polymers or complexes have been utilized in lieu of simple cations. Such inorganic polycationic polymers or complexes have been successful in controlling swelling clays and migrating fines, but they have various limitations. For example, the most commonly used inorganic polycationic polymers are zirconyl chloride ($ZrOCl_2$) and aluminum hydroxychloride ($Al(OH)_xCl_y$). Aluminum hydroxychloride requires a cure time after it is placed in the presence of clay which is disadvantageous in that rig and production time are consumed during the wait. Also, aluminum hydroxychloride can tolerate only a limited amount of carbonate material in the formation and is removed by contact with acids such as when a subsequent acid treatment of the formation is necessary. Zirconyl chloride is limited in the pH range of the placement fluid and can be removed by acid under certain conditions.

Organic cationic surfactants have also been utilized for stabilizing clays and controlling migrating fines. If the organic portion of the cation is large enough, the organic cation is not readily replaced. However, cationic surfactants have a tendency to oil wet the formation which is considered by many to be a disadvantage because it retards the production of oil and accelerates the production of aqueous fluids.

By the present invention a hydrocarbon base treating fluid for stabilizing clays in a water-sensitive clay-containing formation is provided which includes certain organic polycationic clay stabilizing polymers. When the treating fluid is introduced into a subterranean formation and contacts clays therein, the organic polycationic polymers react with the clays to prevent the swelling thereof and the consequent migrating of fines in the formation. The organic polycationic polymers transform the clays into more stable forms which are much less likely to swell or migrate.

The treating fluids of the present invention are hydrocarbon base fluids and thereby do not themselves cause the introduction of appreciable amounts of foreign water into the formation. The organic polycationic polymers contained in the treating fluids can be applied to all types of formations regardless of carbonate content, and they are resistant to being removed by brines, oil or acids and are thereby not removed by produced fluids. The treated formations can be subjected to subsequent treatments with acid and other aqueous fluids without destroying the clay stability of the formations. In addition, oil wetting of the formation is substantially avoided and no cure time is required. Methods of forming the hydrocarbon base clay stabilizing treating fluids of this invention as well as methods of using the treating fluids are also provided.

A variety of organic polycationic polymers which react with and stabilize water-sensitive clays can be utilized in accordance with this invention. Such polymers are generally characterized by the following structural formula:

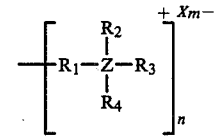

wherein:
R$_1$ is an organic aliphatic, cycloaliphatic, or aromatic radical containing from about 1 to about 40 carbon atoms and containing from 0 to about 6 oxygen or nitrogen atoms, or R$_1$ is hydrogen, and when R$_1$ is cycloaliphatic, Z and R$_2$ can be in the ring;

R$_2$, R$_3$ and R$_4$ are organic radicals independently defined the same as R$_1$ but containing from 0 to 6 carbon atoms and from 0 to 2 oxygen or nitrogen atoms with the limitation that when Z is sulfur, R$_4$ is not present;

Z is a cation such as nitrogen, phosphorous or sulfur;

X is an anion such as halide, nitrate, sulfate, bisulfate, carbonate, hydroxide, borates, oxides, azides, cyanamides, phospates, etc.;

n is an integer equal to the number of monomer units in the polymer required to give a molecular weight in the range of from about 800 to about 3,000,000 and preferably in the range of from about 1,000 to about 100,000; and m is an integer equal to the number of anions required to maintain electronic neutrality.

Of the various organic polycationic polymers which can be utilized, a particularly suitable and presently preferred such polymer is a polydimethyldiallylammonium polymer. The repeating units contained in such polymer have heretofore been defined by the structural formula:

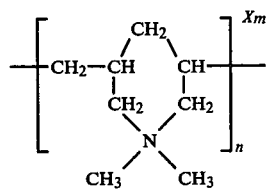

More recently, however, it has been thought that in the preparation of the polymer, two additional structures are formed in a mixture with the above structure as follows:

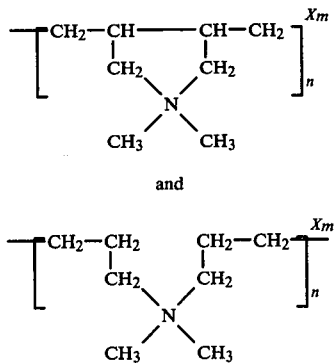

In all of the above structures:
X is an anion, preferably chloride;
n is an integer equal to the number of repeating units in the polymer required to give a molecular weight in the range of from about 800 to about 3,000,000; and
m is an integer equal to the number of anions required to maintain electronic neutrality.

In referring to such polydimethyldiallylammonium polymers hereinafter, the first structure given above will be used with the understanding that the polymer can be of the other structures given or a mixture of two or more of the structures.

Another particularly suitable and presently preferred organic polycationic polymer is a condensation polymer of dimethylamine and epichlorohydrin containing repeating units having the structural formula:

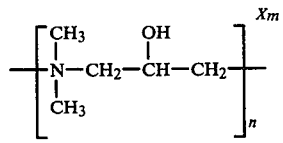

wherein:
X is an anion, preferably chloride;
n is an integer equal to the number of repeating units in the polymer required to give a molcular weight in the range of from about 800 to about 3,000,000; and
m is an integer equal to the number of anions required to maintain electronic neutrality.

The hydrocarbon base treating fluids of this invention containing the above-described clay stabilizing organic polycationic polymers are comprised of a hydrocarbon external, hydrocarbon liquid-aqueous polymer solution emulsion dispersed in a hydrocarbon carrier liquid. The organic polycationic polymers are dissolved in the aqueous phase of the emulsion and when the emulsion contacts water sensitive clays in a subterranean formation, the emulsion inverts and the organic polycationic polymers react with and stabilize the clays. While the emulsion contains water, the quantity of water is small and does not have an adverse affect on water sensitive clays on the formation.

In preparing the hydrocarbon base treating fluids of the present invention, an aqueous solution of one or more of the above-described organic cationic polymers is prepared. The polymers are dissolved in the aqueous solution in an amount in the range of from about 1% to about 60% by weight of the aqueous solution. In concentrations below about 1% by weight, the quantity of polymer in the final hydrocarbon base treating fluid is too small to be effective. In concentrations above about 60% by weight of the aqueous solution, the viscosity of the aqueous solution is generally too high to form a satisfactory emulsion therefrom. More preferably, the aqueous solution contains organic cationic polymer in an amount in the range of from about 10% to about 50% by weight of the solution and most preferably in an amount of about 30% by weight.

In addition to the organic cationic polymer or polymers, the aqueous solution can also contain a freezing point depressant such as an alcohol or one or more salts. For example, alcohols such as methyl, ethyl or propyl alcohol can be present in the aqueous solution at concentrations up to about 10% by weight, and/or one or more salts such as ammonium, alkali metal and alkaline earth metal halides which do not form insoluble precipitates with materials in the formation to be treated can be present at concentrations up to about 15% by weight.

A mixture of a hydrocarbon liquid and a surfactant which functions as an emulsifier is next prepared. The hydrocarbon liquid can be any of a variety of hydrocarbon liquids which are not appreciably vaporized at atmospheric conditions. Particularly suitable such hydrocarbon liquids are kerosene, diesel oil and crude oil. While various surfactants which function as emulsifiers can be utilized, a particularly suitable and presently preferred such surfactant is comprised of alkylhydroxyethylimidazoline dissolved in isopropyl alcohol in an amount of about 80% by weight. The alkylhydroxyethylimidazoline has the following structural formula:

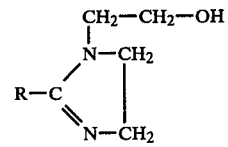

wherein:
R is an alkyl group having in the range of from about 16 to about 18 carbon atoms. The alkylhydroxyethylimidazoline isopropyl alcohol emulsifier is combined with the hydrocarbon liquid in an amount in the range of from about 2.5% to about 25% by volume of the resultant surfactant hydrocarbon liquid mixture. More preferably, the mixture contains in the range of from about 10% to about 15% emulsifier by volume of the mixture and most preferably 12.5% by volume.

The aqueous polymer solution and emulsifier-hydrocarbon liquid mixture are next combined and agitated to form a hydrocarbon external, hydrocarbon liquid-aqueous polymer solution emulsion. The emulsion preferably contains in the range of from about 60% to about 95% by volume aqueous polymer solution, and more preferably, in the range of from about 75% to about 90% by volume aqueous solution. Most preferably the emulsion contains 80% by volume of the aqueous solution. The use of the above-described alkylhydroxyethylimidazoline emulsifier in forming the emulsion brings about a stable hydrocarbon external emulsion. That is, the resulting emulsion can be stored for relatively long periods of time without aqueous phase separation. The emulsions of this invention are considered to have good stability in that less than 10% of the oil phase separates from the emulsion in 48 hours at a temperature of 120° F. with no appreciable aqueous phase separation.

The final step in preparing the hydrocarbon base treating fluids of this invention is to disperse the above-described hydrocarbon external emulsion into a hydrocarbon liquid carrier. Any of a variety of hydrocarbon liquids can be utilized as the carrier which are compatible with the formation being treated and which do not substantially vaporize at atmospheric conditions. Particularly suitable hydrocarbon liquids for use as the carrier liquid are kerosene, diesel oil and crude oil. The quantity of hydrocarbon external emulsion dispersed in the hydrocarbon carrier liquid can vary, depending upon the concentration and types of clays to be treated, but generally is in the range of from about ½ to 24 gallons of emulsion per 1,000 gallons of carrier liquid. Most preferably, the emulsion is dispersed into the carrier liquid in an amount in the range of from about 5 to 10 gallons of emulsion per 1,000 gallons of carrier liquid.

In using the hydrocarbon base treating fluid of the present invention for stabilizing water sensitive clays in subterranen formations, the treating fluid is introduced into the formation and flowed or otherwise passed into contact with the clays and fines contained therein. As the emulsion dispersed in the treating fluid contacts the clays, the emulsifier contained therein is adsorbed out of the emulsion whereby the emulsion inverts and the organic clay stabilizing polycationic polymers in the aqueous phase of emulsion contact the clays and react therewith. This process takes place very rapidly and it is not necessary for the treating fluid to remain in contact with the clays and fines for any appreciable length of time.

Once the organic polycationic polymers have contacted the water sensitive clays in the formation, the clays are stabilized and substantially prevented from swelling. In addition, the polymers are resistant to being removed by brines, oils or acids and the formation is essentially water wet after completion of the treatment. As it will be understood by those skilled in the art, the treating fluids of this invention can be utilized individually or they can be utilized in combined treatments of subterranean formations.

In order to facilitate a clear understanding of the hydrocarbon base treating fluids and methods of the present invention the following example is given.

EXAMPLE

Sand packs saturated with brine containing 5% clay are placed in apparatus whereby various liquids can be flowed through the sand packs. The clay in the sand packs is smectite clay which when contacted with fresh water after being in contact with brine swells appreciably. The brine utilized has the following composition:

| Component | Concentration % by Weight |
|---|---|
| NaCl | 6.9 |
| $CaCl_2$ | 0.53 |
| $MgCl_2.6H_2O$ | 0.39 |

In a first test, the flow rate of brine through the sand pack is measured at 50 psig. Kerosene is then flowed through the sand pack at 50 psig followed by additional brine at the same pressure. The flow rate of the brine through the sand pack after the kerosene has been flowed therethrough is measured and calculated as a percent of the initial brine flow rate through the sand pack. Fresh water is then attempted to be flowed through the sand pack at the same pressure.

In a second test, brine is flowed through a second sand pack and the flow rate determined at 50 psig. A hydrocarbon base clay stabilizing treatment fluid of the present invention is then flowed through the sand pack followed by brine, fresh water, an aqueous acid solution containing 15% by weight hydrochloric acid and additional fresh water, all at 50 psig. The flow rates of the brine and fresh water are measured and calculated as a percent of the initial brine flow rate through the sand pack.

In a third test, instead of brine, kerosene is initially flowed through a sand pack at 50 psig and the flow rate measured. Fresh water followed by additional kerosene are then flowed through the sand pack at the same pressure and the flow rate of kerosene is measured and calculated as a percent of the initial kerosene flow rate.

In a fourth test, kerosene is initially flowed through a sand pack followed by a hydrocarbon base treating fluid of this invention, fresh water, kerosene, an aqueous acid solution containing 15% by weight hydrochloric acid and additional kerosene, all at 50 psig. The flow rates of the kerosene are determined and calculated as a percent of the initial kerosene flow.

The hydrocarbon base treating fluid of the present invention used in the tests is comprised of an aqueous solution containing 30% by weight of an organic polycationic polymer wherein the repeating units of the polymer have the structural formula:

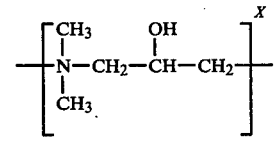

and wherein X is chloride and the polymer has a molecular weight average of 25,000. The aqueous polymer solution is formed into a hydrocarbon external emulsion using kerosene containing 2.5% by volume of an alkylhydroxyethylimidazoline-isopropyl alcohol emulsifier having 16–18 carbon atoms in the alkyl group and the emulsion contains 80% by volume aqueous phase. The hydrocarbon external emulsion is dispersed in additional kerosene in an amount of 12 gallons per thousand gallons of kerosene.

The results of these test are given in Table I below.

TABLE I

COMPARISON OF FLUID FLOW RATES THROUGH NON-TREATED AND TREATED CLAYEY SAND PACKS

| | Test No. 1 | Test No. 2 | Test No. 3 | Test No. 4 |
|---|---|---|---|---|
| Calibration | | | | |
| Calibration Fluid | Brine | Brine | Kerosene | Kerosene |
| Flow Rate (cc/min) | 0.305 | 0.338 | 0.463 | 0.403 |
| Test Sequence | | | | |
| Treatment | Kerosene | Treating Fluid of Present Invention | Kerosene | Treating Fluid of Present Invention |
| Brine, % of Initial Brine Flow Rate | 26 | 42 | — | — |
| Fresh Water, % of Initial Brine Flow Rate | 0 | 41 | — | — |
| Brine After Acid Treatment, % of Initial Brine Flow Rate | — | 42 | — | — |
| Fresh Water, % of Initial Brine Flow Rate | — | 36 | — | — |
| Kerosene, % of Initial Brine Flow Rate | — | — | 100 | 96 |
| Kerosene After Fresh Water, % of Initial Kerosene Flow Rate | — | — | 6 | 79 |
| Kerosene After Acid Treatment, % of Initial Kerosene Flow Rate | — | — | — | 74 |

From Table I it can be seen that when a sand pack containing smectite clay is contacted with fresh water without first stabilizing the clay, the flow of fluids therethrough are drastically diminished. From Tests 2 and 4 it can be seen that the hydrocarbon base treating fluid of the present invention stabilizes the clay whereby appreciable flow of fluids remain after contact with fresh water. In addition, Tests 2 and 4 show that the treating fluid renders the clay nonsensitive to acid treatment.

What is claimed is:

1. A method of forming a hydrocarbon base treating fluid for stabilizing clays in a water-sensitive subterranean clay-containing formation comprising the steps of:

forming an aqueous solution of an organic clay stabilizing polymer selected from the group consisting of a polydimethyldiallylammonium polymer wherein the repeating units have the structural formula

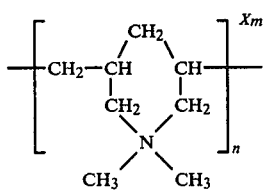

and wherein X is an anion, n is an integer equal to the number of repeating units in the polymer required to give a molecular weight in the range of from about 800 to about 3,000,000, and m is an integer equal to the number of anions required to maintain electronic neutrality and an organic polycationic polymer which is a condensation polymer of dimethylamine and epichlorohydrin wherein the repeating units have the structural formula:

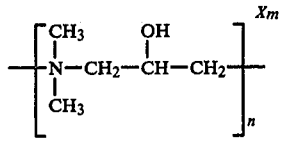

and wherein X is an anion, n is an integer equal to the number of repeating units in the polymer required to give a molecular weight in the range of from about 800 to about 3,000,000 and m is an integer equal to the number of anions required to maintain electronic neutrality;

said organic polycationic polymer being present in said aqueous solution in an amount in the range of from about 1% to about 60% by weight of said aqueous solution;

forming a mixture of an alkylhydroxyethylimidazoline-isopropyl alcohol emulsifier represented by the structural formula:

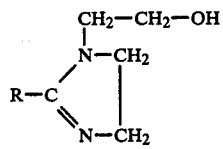

wherein R contains in the range of from about 16 to about 18 carbon atoms and hydrocarbon liquid;

combining said aqueous polymer solution with said emulsifier-hydrocarbon liquid mixture to form a hydrocarbon external, hydrocarbon liquid-aqueous polymer solution emulsion;

said aqueous polymer solution being present in said hydrocarbon external emulsion in an amount in the range from about 60% to about 95% by volume of said emulsion; and dispersing said hydrocarbon external emulsion in a hydrocarbon carrier liquid in an amount in the range of from about 0.5 to about 24 gallons of emulsion per 1,000 gallons of said carrier liquid to form said treating fluid.

2. The method of claim 1 wherein said hydrocarbon liquid used for forming said emulsion is selected from the group consisting of kerosene, diesel oil and crude oil.

3. The method of claim 2 wherein said hydrocarbon carrier liquid is selected from the group consisting of kerosene, diesel oil and crude oil.

4. The method of claim 1 wherein said alkylhydroxyethylimidazoline emulsifier is present in the hydrocarbon liquid phase of said emulsion in an amount in the range of from about 2.5% to about 25% by volume of said emulsion.

5. A method of stabilizing clays in a water-sensitive subterranean clay-containing formation comprising the steps of:

forming an aqueous solution of an organic clay stabilizing polymer selected from the group consisting of a polydimethyldiallylammonium polymer wherein the repeating units have the structural formula

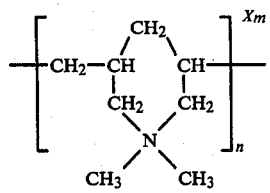

and wherein X is an anion, n is an integer equal to the number of repeating units in the polymer required to give a molecular weight in the range of from about 800 to about 3,000,000, and m is an integer equal to the number of anions required to maintain electronic neutrality and an organic polycationic polymer which is a condensation polymer of dimethylamine and epichlorohydrin wherein the repeating units have the structural formula:

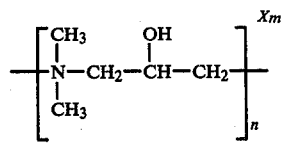

and wherein X is an anion, n is an integer equal to the number of repeating units in the polymer required to give a molecular weight in the range of from about 800 to about 3,000,000 and m is an integer equal to the number of anions required to maintain electronic neutrality;

said organic polycationic polymer being present in said aqueous solution in an amount in the range of from about 1% to about 60% by weight of said aqueous solution;

forming a mixture of an alkylhydroxyethylimidazoline-isopropyl alcohol emulsifier represented by the structural formula:

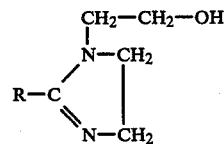

wherein R contains in the range of from about 16 to about 18 carbon atoms and hydrocarbon liquid;

combining said aqueous polymer solution with said emulsifier-hydrocarbon liquid mixture to form a hydrocarbon external, hydrocarbon liquid-aqueous polymer solution emulsion;

said aqueous polymer solution being present in said hydrocarbon external emulsion in an amount in the range from about 60% to about 95% by volume of said emulsion; and dispersing said hydrocarbon external emulsion in a hydrocarbon carrier liquid in an amount in the range of from about 0.5 to about 24 gallons of emulsion per 1,000 gallons of said carrier liquid to form said treating fluid; and introducing said hydrocarbon base clay stabilizing treating fluid into said water-sensitive subterranean formation.

6. The method of claim 5 wherein said hydrocarbon liquid used for forming said emulsion is selected from the group consisting of kerosene, diesel oil and crude oil.

7. The method of claim 6 wherein said hydrocarbon carrier liquid is selected from the group consisting of kerosene, diesel oil and crude oil.

8. The method of claim 5 wherein said alkylhydroxyethylimidazoline emulsifier is present in the hydrocarbon liquid phase of said emulsion in an amount in the range of from about 2.5% to about 25% by volume of said emulsion.

9. A method of stabilizing clays in a water-sensitive subterranean clay-containing formation comprising the steps of:

forming an aqueous solution of an organic clay stabilizing polymer selected from the group consisting of a polydimethyldiallylammonium polymer wherein the repeating units have the structural formula

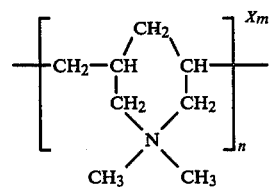

and wherein X is an anion, n is an integer equal to the number of repeating units in the polymer required to give a molecular weight in the range of from about 800 to about 3,000,000, and m is an integer equal to the number of anions required to maintain electronic neutrality and an organic polycationic polymer which is a condensation polymer of dimethylamine and epichlorohydrin wherein the repeating units have the structural formula:

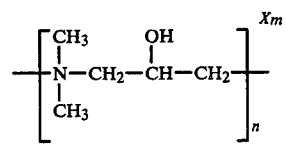

and wherein X is an anion, n is an integer equal to the number of repeating units in the polymer required to give a molecular weight in the range of from about 800 to about 3,000,000, and m is an integer equal to the number of anions required to maintain electronic neutrality, said organic clay stabilizing polymer being present in said aqueous solution in an amount of about 30% by weight of said solution;

forming a mixture of an alkylhydroxyethylimidazoline-isopropyl alcohol emulsifier represented by the structural formula:

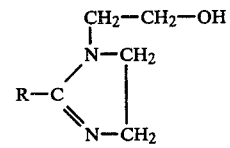

wherein R contains in the range of from about 16 to about 18 carbon atoms and a hydrocarbon liquid, said emulsifier being present in said mixture in an amount of about 12.5% by volume of said mixture;

combining said aqueous polymer solution with said emulsifier-hydrocarbon liquid mixture to form a hydrocarbon external, hydrocarbon liquid-aqueous polymer solution emulsion, said aqueous polymer solution being present in said emulsion in an amount of about 80% by volume of said emulsion;

dispersing said hydrocarbon liquid external emulsion in a hydrocarbon carrier liquid in an amount in the range of from about 5 to about 10 gallons per 1,000 gallons of carrier liquid to form a hydrocarbon base clay stabilizing treating fluid; and introducing said hydrocarbon base clay stabilizing treating fluid into said water-sensitive subterranean formation.

10. The method of claim 9 wherein said hydrocarbon liquid used for forming said emulsion is selected from the group consisting of kerosene, diesel oil and crude oil.

11. The method of claim 10 wherein said hydrocarbon carrier liquid is selected from the group consisting of kerosene, diesel oil and crude oil.

* * * * *

UNITED STATES PATENT AND TRADEMARK OFFICE
CERTIFICATE OF CORRECTION

PATENT NO. : 4,460,483
DATED : July 17, 1984
INVENTOR(S) : Jimmie D. Weaver

It is certified that error appears in the above-identified patent and that said Letters Patent is hereby corrected as shown below:

In Column 3, line 19 thru line 24, delete

"
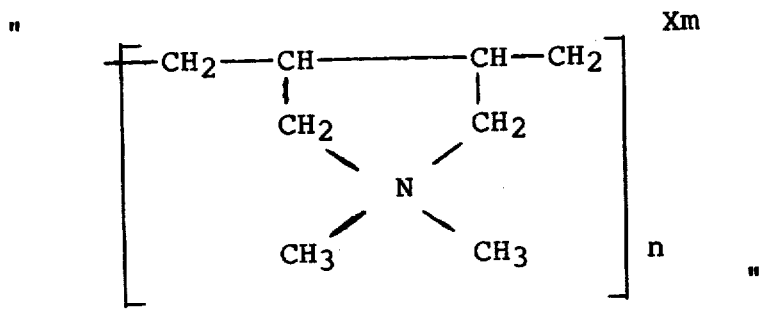
"

and insert

--
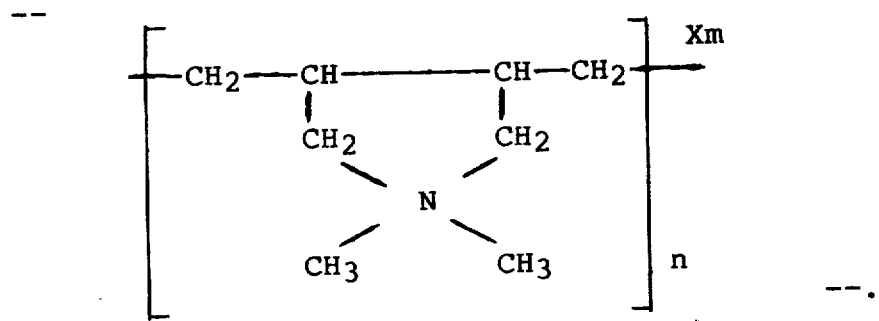
--.

UNITED STATES PATENT AND TRADEMARK OFFICE
CERTIFICATE OF CORRECTION

PATENT NO. : 4,460,483

DATED : July 17, 1984

INVENTOR(S) : Jimmie D. Weaver

It is certified that error appears in the above-identified patent and that said Letters Patent is hereby corrected as shown below:

In Column 4, line 51 thru line 56, delete

"
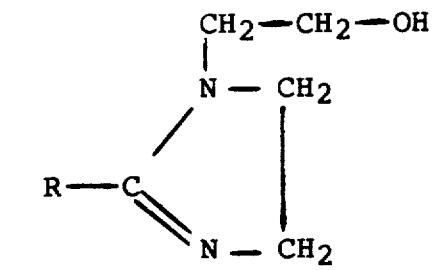
"

and insert

--
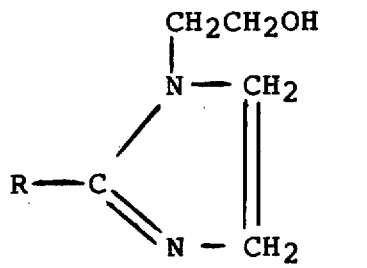
--.

Signed and Sealed this

Fourth Day of December 1984

[SEAL]

Attest:

GERALD J. MOSSINGHOFF

Attesting Officer

Commissioner of Patents and Trademarks